US008189695B2

(12) United States Patent
Ito et al.

(10) Patent No.: US 8,189,695 B2
(45) Date of Patent: May 29, 2012

(54) TRANSMISSION METHOD AND TRANSMISSION APPARATUS IN AN OFDM-CDMA COMMUNICATION SYSTEM

(75) Inventors: Akira Ito, Kawasaki (JP); Masahiko Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 307 days.

(21) Appl. No.: 11/822,354

(22) Filed: Jul. 5, 2007

(65) Prior Publication Data
US 2007/0258509 A1 Nov. 8, 2007

Related U.S. Application Data

(63) Continuation of application No. PCT/JP2005/000518, filed on Jan. 18, 2005.

(51) Int. Cl.
*H04K 1/10* (2006.01)
(52) U.S. Cl. ......... 375/260; 375/141; 375/259; 375/130
(58) Field of Classification Search ............ 375/260, 375/130, 140, 141, 259; 455/59
See application file for complete search history.

(56) References Cited

U.S. PATENT DOCUMENTS

| | | | | |
|---|---|---|---|---|
| 6,345,036 B1* | 2/2002 | Sudo et al. | | 370/203 |
| 6,721,569 B1* | 4/2004 | Hashem et al. | | 455/450 |
| 6,801,566 B2* | 10/2004 | Ha | | 375/148 |
| 6,839,335 B1 | 1/2005 | Sudo | | |
| 7,039,120 B1* | 5/2006 | Thoumy et al. | | 375/275 |
| 7,200,177 B2* | 4/2007 | Miyoshi | | 375/260 |
| 7,215,927 B2* | 5/2007 | Miyoshi | | 455/45 |
| 7,265,714 B2* | 9/2007 | Goldberg | | 342/378 |
| 7,443,827 B2* | 10/2008 | Sano | | 370/342 |
| 7,826,435 B1* | 11/2010 | Wu et al. | | 370/342 |
| 2003/0169681 A1* | 9/2003 | Li et al. | | 370/203 |
| 2003/0185179 A1* | 10/2003 | Inogai et al. | | 370/335 |
| 2004/0037262 A1* | 2/2004 | Tanada | | 370/342 |
| 2004/0071078 A1* | 4/2004 | Sudo | | 370/208 |
| 2004/0076172 A1 | 4/2004 | Sano | | |
| 2005/0099937 A1* | 5/2005 | Oh et al. | | 370/207 |
| 2005/0128993 A1* | 6/2005 | Yu et al. | | 370/342 |
| 2005/0213682 A1* | 9/2005 | Han et al. | | 375/267 |

(Continued)

FOREIGN PATENT DOCUMENTS
JP 2001-86093 3/2001
(Continued)

OTHER PUBLICATIONS

Fu et al.; "Fundamental Analysis on Throughput Characteristics of Orthogonal Frequency Division Multiple Access (OFDMA) in Multipath Propagation Environments"; Dated Nov. 1, 2002; English translation of 1 and 2.

(Continued)

*Primary Examiner* — Shuwang Liu
*Assistant Examiner* — Helene Tayong
(74) *Attorney, Agent, or Firm* — Myers Wolin, LLC

(57) ABSTRACT

A OFDM-CDMA communication system that generates a plurality of subcarrier components by multiplying each of a plurality of transmission symbols by a channelization code whose length is N according to a spreading factor, and transmits those subcarrier components by a plurality of different subcarriers, measures the propagation environment of each subcarrier, divides the subcarriers into groups having N number of subcarriers in each group whose propagation environments are close one another, and transmits the N number of subcarrier components, which have been multiplied by the channelization code, by subcarriers of the same group.

18 Claims, 13 Drawing Sheets

U.S. PATENT DOCUMENTS

2006/0034382 A1* 2/2006 Ozluturk et al. ............... 375/267
2006/0160498 A1* 7/2006 Sudo ............................. 455/103

FOREIGN PATENT DOCUMENTS

| | | |
|---|---|---|
| JP | 2001-268050 | 9/2001 |
| JP | 2003-348047 | 12/2003 |
| JP | 2004-4104574 | 4/2004 |

OTHER PUBLICATIONS

Japanese Patent Office "Notice of Reason for Refusal" issued for corresponding Japanese Patent Application No. 2010-205182, dispatched Sep. 20, 2011. English translation attached.

* cited by examiner

TRANSMISSION METHOD AND TRANSMISSION APPARATUS IN AN OFDM-CDMA COMMUNICATION SYSTEM

This application is a continuation of International Application No. PCT/JP2005/000518, filed Jan. 18, 2005.

BACKGROUND OF THE INVENTION

The present invention relates to a transmission method and transmission apparatus in an OFDM-CDMA communication system, and more particularly to a transmission method and transmission apparatus in an OFDM-CDMA communication system that divides subcarriers into groups of subcarriers having close or equivalent propagation environments (for example electrical power), and transmits subcarrier components that have been multiplied by channelization code by subcarriers of the same group.

Much attention has been paid to multicarrier communication methods as a next-generation mobile communication method. By using a multicarrier communication method, wideband, high-speed transmission is possible, and by making the bandwidth of each subcarrier narrow, it is possible to reduce the effect of frequency selective fading. Particularly, by using an Orthogonal Frequency Division Multiplexing (OFDM) method, it is possible to further improve the frequency utilization efficiency, and by using a guard interval after each OFDM symbol, it is possible to eliminate the effect of intersymbol interference.

Also, recently, research concerning a multicarrier CDMA method (OFDM-CDMA) is actively being pursued, and application to a next-generation wideband mobile communication method is being studied. In OFDM-CDMA transmission, each symbol is spread (for example, multiplied by spreading code (channelization code) of a length N that corresponds to the spreading factor) to create a plurality of subcarrier components, and those subcarrier components are respectively transmitted by corresponding subcarriers. By performing spreading in the frequency direction in this way, subcarriers, whose frequency spacing has been separated receive independent fading by frequency selective fading.

FIG. 12 shows an example of the construction of a transmission apparatus (base station) for an OFDM-CDMA communication system. Here, a data modulation unit 11 modulates the user's transmission data, and converts the in-phase component and orthogonal component to complex baseband signals (symbols). A time multiplexing unit 12 performs time multiplexing of pilots (common pilots) of a plurality of symbols in front of the transmission data. A serial-to-parallel conversion unit 13 converts input data to parallel data for M number of symbols, divides each symbol into N number of branches, and inputs the result to a spreading unit 14. The spreading unit 14 comprises M number of multiplication units $14_1$ to $14_M$, and each of the multiplication units $14_1$ to $14_M$ multiplies the branch symbols by respective channelization code and output the results. In other words, the spreading unit 14 performs spreading by multiplying one branched symbol by channelization code ($C_1$ to $C_N$) having length N, and outputs signals $S_1$ to $S_N$ that are spread by the chips ($C_1, \ldots, C_N$) of the channelization code. As a result, subcarrier signals $S_1$ to $S_{MN}$ for multicarrier transmission by M×N number of subcarriers are output from the spreading unit 14. That is, the spreading unit 14 performs spreading in the frequency direction by multiplying each of M number of symbols by channelization code made up of chips $C_1$ to $C_N$. The channelization code that is used in spreading differs for each user or control channel, and code that is orthogonal with each other is used as the channelization code for each user or control.

A code multiplexing unit 15 multiplexes the subcarrier signals that were generated as described above with subcarrier signals of other users and subcarrier signals for control that were generated using a similar method. In other words, for each subcarrier, adding units $15_1$ to $15_{MN}$ of the code multiplexing unit 15 combine and output the subcarrier signals for a plurality of users and subcarrier signals for control that correspond to the subcarrier. An IFFT (Inverse Fast Fourier Transform) unit 16 performs IFFT (inverse Fourier transformation) of the subcarrier signals that are input in parallel, and converts them to M×N number of subcarrier signal components (OFDM signal) on the time axis. A guard interval insertion unit 17 inserts guard intervals having a specified length into the ODM signal, an orthogonal modulation unit 18 performs orthogonal modulation of the OFDM signal in which guard intervals have been inserted, and a radio transmission unit 19 performs UP conversion of the frequency to a radio frequency, as well as performs high-frequency amplification and transmits the signal from an antenna.

The total number of subcarriers is (the number of parallel lines M)×(spreading factor N). Also, in the propagation path, in order to receive different fading for each subcarrier, pilots are time multiplexed on all subcarriers, and on the receiving side, fading compensation (channel estimation/channel compensation) is performed for each subcarrier.

FIG. 13 shows an example of construction of a receiving apparatus in an OFDM-CDMA communication system. A radio receiving unit 21 performs frequency conversion of a received multicarrier signal, and an orthogonal demodulation unit 22 performs orthogonal demodulation of the received signal. A timing synchronization and guard interval removal unit 23 performs timing synchronization of the received signal, removes the guard intervals from the received signal, and inputs the result to a FFT (Fast Fourier Transform) unit 24. The FFT unit 24 performs FFT processing using FFT window timing, and converts the time-domain signal to M×N number of subcarrier signals (subcarrier symbols).

A channel estimation unit 25 uses the pilots that were time multiplexed by the transmitting side and performs channel estimation for each subcarrier, then finds a channel compensation value for each subcarrier and inputs the values to a channel compensation unit 26, after which the channel compensation unit 26 multiplies each subcarrier signal by a channel compensation value to perform fading compensation (channel compensation). In other words, the channel estimation unit 25 uses the pilot signal to estimate the amplitude due to fading and phase effect $A_i \cdot \exp(j\phi_i)$ for each subcarrier, and the multiplication units $26_i$ (i=1 to M×N) of the channel compensation unit 26 multiply the subcarrier signals of the transmission symbols by $(1/A_i) \cdot \exp(-j\phi_i)$ to compensate for fading.

An despreading unit 27 comprises M number of multiplication units $27_1$ to $27_M$, and the multiplication unit $27_1$ multiplies N number of subcarrier components individually by $C_1, C_2, \ldots C_N$ of the channelization code that is assigned for a user, and outputs the result, while each of the other multiplication units perform similar processing. As a result, despreading is performed on fading-compensated signals by using channelization code (spreading code) that is assigned for each user, and by this despreading, the signal for a desired user is extracted from the code multiplexed signal.

Combination units $28_1$ to $28_M$ add the N number of multiplication results that are output from the multiplication units $27_1$ to $27_M$ to create parallel data made up of M number of symbols, a parallel-to-serial conversion unit 29 converts that parallel data to serial data, and a data demodulation unit 30 demodulates the transmission data.

When spreading is performed in the frequency direction in OFDM-CDMA communication as described above, subcarrier components having the same numbers as shown in FIG. 14 are spread as the subcarrier components for one symbol and transmitted. FIG. 14 shows the case in which OFDM-CDMA communication is performed at specified timing $t_i$ for three symbols (M=3) at a time, where the spreading factor is taken to be four (N=4). In the figure, portions having the same number are chip data for one symbol, and in this case, during transmission, each symbol is multiplied and spread by channelization code (spreading code) having a symbol length of four. On the receiving side, despreading is performed at each timing, and one symbol comprising the four chips having the same number as in FIG. 14 is demodulated. In the OFDM-CDMA communication method, by multiplying and spreading data for each user by different channelization code at the same time $t_i$, it is possible to perform multiplexed data communication. In this case, the channelization code for each user and for control data is orthogonal to each other, so there is no interference between each other. However, in the CDMA communication method in which spreading is performed on the transmitting side and demodulation is performed by despreading on the receiving side, it is presumed that on the receiving side the amplitude of each chip is nearly the same.

OFDM-CDMA communication differs from W-CDMA communication or the like in which spreading is performed in the time direction, in that frequency selective fading occurs due to multipaths. There are cases in which, even though the amplitude of each chip is the same in the time direction, the amplitude may greatly vary in the frequency direction. When the amplitude of each chip is not the same, othogonality of the spreading code is lost and components of other code are mixed in, so the reception characteristic becomes poor. An example of Downlink communication is explained below, however, the same method can be applied to Uplink communication.

In the OFDM-CDMA communication method, frequency selective fading occurs. As shown in FIG. 15, even when the same electrical power from the base station is allotted for each subcarrier (frequency), when a terminal (mobile station) receives the subcarriers, the power for each subcarrier differs due to the effect of the propagation path (channel). This is because signals that are transmitted from the base station arrive at the mobile station at a plurality of different times in multipaths due to reflection by buildings and the like.

Moreover, the OFDM-CDMA communication method is characterized by multiplexing a plurality of data at the same time by using orthogonal channelization code. The basis of this orthogonality is that the amplitude of each chip is the same, and when the amplitude is different, orthogonality is lost, multiplexed data interfere with each other, and the reception characteristic becomes poor. For example, in a case where a spreading factor is 4, the code 1, 1, −1, −1 and code 1, 1, 1, 1 are orthogonal. Generally in the case of codes a1, a2, a3, a4 and b1, b2, b3, b4, The orthrogonality can be determined by whether or not the condition a1×b1+a2×b2+a3×b3+a4×b4=0 is satisfied. However, when the amplitude of the first chip is twice the amplitude of the others, then 2×2+1×1+(−1)×1+(−1)×1=3, and the codes are no longer orthogonal. The portion that is not orthogonal becomes the interference component.

As shown in FIG. 14, in a normal OFDM-CDMA communication method in which spreading is performed in the frequency direction, the N number of subcarrier components resulting from multiplying data for one symbol by spreading code having a spreading factor N (=4) are allotted in order of frequency to each subcarrier. The reason for this allocation is that there is a high possibility that there is very little difference in the amplitudes of chips having frequencies that are close. However, as shown in FIG. 15, in an environment where there is a large fluctuation in frequency selective fading, the amplitudes may be greatly different even though the frequencies are close. In that case, the data of the spreading code for each terminal is no longer orthogonal and interference occurs, and thus demodulation cannot be performed properly. As a method for preventing this deterioration, proposed is prior art (see JP 2001-86093A) in which the amplitudes of each of the chips are made the same and a loss of orthogonality is avoided by increasing the weighting on the receiving side for subcarriers having small amplitudes. By doing this, it is possible to suppress interference with other code signals, however, it is impossible to execute maximum ratio combining. For the subcarriers that having small amplitudes, it is preferable to combine them as they are, thereby the maximum ratio combining becomes possible, and communication quality becomes high. The prior art performs the opposite of maximum ratio combining, so there is little improvement in quality.

SUMMARY OF THE INVENTION

Taking into consideration the aforementioned problems, it is the object of the present invention to reduce fluctuation in the reception amplitude of the N number of subcarrier components on the receiving side by transmitting the N number of subcarrier components, which are obtained by multiplying symbol data by spreading code having a spreading factor of N, by subcarriers having the equivalent propagation environment (reception power, reception amplitude).

Another object of the present invention is to prevent losing orthogonality between the N number of subcarrier components on the receiving side and spreading code of other users, and prevent interference with signals of other users when transmitting the N number of subcarrier components, which are obtained by multiplying symbol data by spreading code having a spreading factor of N.

Another object of the present invention is to reduce the degree of reception error on the receiving side.

Another object of the present invention is to prevent transmission of the corresponding relation between the subcarrier components and subcarriers from the transmission apparatus to the receiving apparatus, by allotting the N number of subcarrier components, which are multiplied by spreading code, to subcarriers in order of frequency when the communication environment is good, and transmitting those subcarrier components.

Another object of the present invention is to prevent transmission of corresponding relation related information about the subcarrier components and subcarriers from the transmission apparatus to the receiving apparatus, by allotting the N number of subcarrier components, which are multiplied by spreading code, to subcarriers in order of frequency when the spreading factor is small, and transmitting those subcarrier components.

Another object of the present invention is to prevent time differences from causing adverse effects when there is difference in the time when the propagation environment is measured and the time when data on which the results of the measurement are reflected are actually received, by allotting the N number of subcarrier components, which are multiplied by spreading code, to subcarriers in order of frequency when frequency fading is large; and transmitting those subcarrier components, and by transmitting the N number of subcarrier components, which are obtained by multiplying symbol data by spreading code having a spreading factor N, by subcarriers having close propagation environments (reception power, reception amplitude) when frequency fading is small.

The present invention is a transmission method and transmission apparatus in an OFDM-CDMA communication system that creates a plurality of subcarrier components by multiplying each of a plurality of symbols with spreading code (channelization code) having a length N according to a spreading factor, and transmits those subcarrier components by corresponding subcarriers. The transmission apparatus in the OFDM-CDMA communication system acquires the propagation environment of each subcarrier, divides the subcarriers into groups of N number of subcarriers in each group in order of subcarriers whose propagation environments are close, and transmits N number of subcarrier components, which were obtained by multiplying each symbol by channelization code, by subcarriers of the same group. Also, the transmission apparatus transmits the corresponding relation between the subcarrier components and the subcarriers that transmit the subcarrier components to the receiving side so that demodulation can be performed properly.

By transmitting N number of subcarrier components, which are obtained by multiplying symbol data by spreading code having a spreading factor N, by subcarriers whose propagation environments (reception power, reception amplitude) are close one another as described above, it is possible to reduce fluctuation in the reception amplitude of the N number of subcarrier components on the receiving side, and thus it is possible to prevent a loss in orthogonality between the N number of subcarrier components on the receiving side and the spreading code of other users. As a result, it is possible to prevent interference with signals from other users, and to reduce the degree of reception error on the receiving side.

The receiving apparatus measures the amplitude or power of each subcarrier and notifies the transmission apparatus of the amplitude or power of each subcarrier as the propagation environment, then the transmission apparatus divides each of the subcarriers into groups based on the amplitude or power. By doing this, in the case of the FDD method, it becomes possible to measure the propagation environment with high accuracy, it is possible to prevent a loss of orthogonality, and it is possible to reduce the degree of reception error.

The transmission apparatus measures the propagation environment (amplitude or power) of each subcarrier, and divides each of the subcarriers into groups based on the amplitude or power. In the case of the TDD method, the propagation environment is the same on the receiving side and transmitting side, so the transmission apparatus measures the propagation environment. By doing this, it is not necessary for the receiving side to notify the transmitting side of the propagation environment, which is useful in reducing the amount of communication.

When the communication environment is good, N number of subcarrier components, which are obtained by multiplying each symbol by spreading code, are allotted to subcarriers in order of frequency, and when the communication environment is not good, N number of subcarrier components are allotted to subcarriers in the same group according to the aforementioned group divisions. By doing this, when the communication environment is good, it is not necessary to transmit information from the transmission apparatus to the receiving apparatus about the corresponding relation between the subcarrier components and the subcarriers that transmit the subcarrier components, which is useful in reducing the amount of communication.

When the spreading factor is small, N number of subcarrier components, which are obtained by multiplying each of the symbols by spreading code, are allotted to subcarriers in order of frequency, and when the spreading factor is large, N number of subcarrier components are allotted to subcarriers in the same group according to the aforementioned group divisions. By doing this, when the spreading factor is small, it is not necessary to transmit information from the transmission apparatus to the receiving apparatus about the corresponding relation between the subcarrier components and the subcarriers, which is useful in reducing the amount of communication.

When the fading frequency is acquired and that fading frequency is small, N number of subcarrier components, which are multiplied by spreading code, are allotted to subcarriers in the same group according to the aforementioned group divisions, and when the fading frequency is large, N number of subcarrier components, which are multiplied by spreading code, are allotted to each subcarrier in order of frequency. By doing this, it is possible to perform control so that adverse effects do not occur due to time differences, even when there is a time difference between the time when a propagation environment is measured and the time when the data on which that result is reflected is actually received.

DESCRIPTION OF THE PREFERRED EMBODIMENTS

(A) Overview of the Invention

In an OFDM-CDMA communication system, a transmission apparatus multiplies each symbol by spreading code (channelization code) having a length N (N chips) that correspond to the spreading factor to create a plurality of subcarrier components, and transmits those subcarrier components by corresponding subcarriers. In this OFDM-CDMA communication system, the transmission apparatus divides the subcarriers in order of highest reception power into groups of N number of subcarriers each, and transmits N number of subcarrier components, which were obtained by multiplying symbols by channelization code, by subcarriers of the same group.

Figure 1:
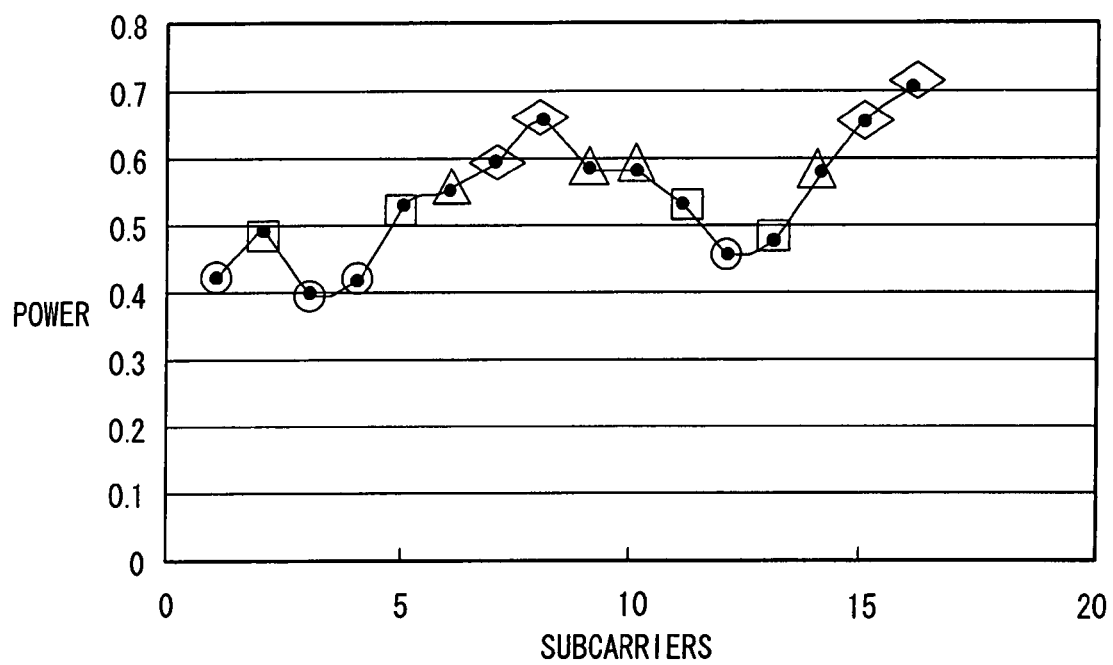
FIG. 1 is a drawing explaining the propagation environment of subcarriers.

In other words, in the OFDM-CDMA communication system, the transmission apparatus comprises a subcarrier group determination unit that determines subcarrier groups to which signals, after transmission symbols have been spread, are allotted based on the propagation environment (for example, size relationship of reception power or, reception quality). In the example shown in FIG. 1 (the spreading factor is taken to be N=4, for all symbols), and four subcarriers indicated by the same shape, for example ○, Δ, etc., are divided into the same group. By doing this, it is possible to reduce the difference in reception power of subcarriers in each group, and prevent a loss of orthogonality, and thus improve the reception characteristic. Also, since the weighting of subcarrier components having low power is not increased on the receiving side as was done in the prior art explained above, it is possible to prevent the reception characteristic from becoming poor.

(B) Embodiment 1

Figure 2:
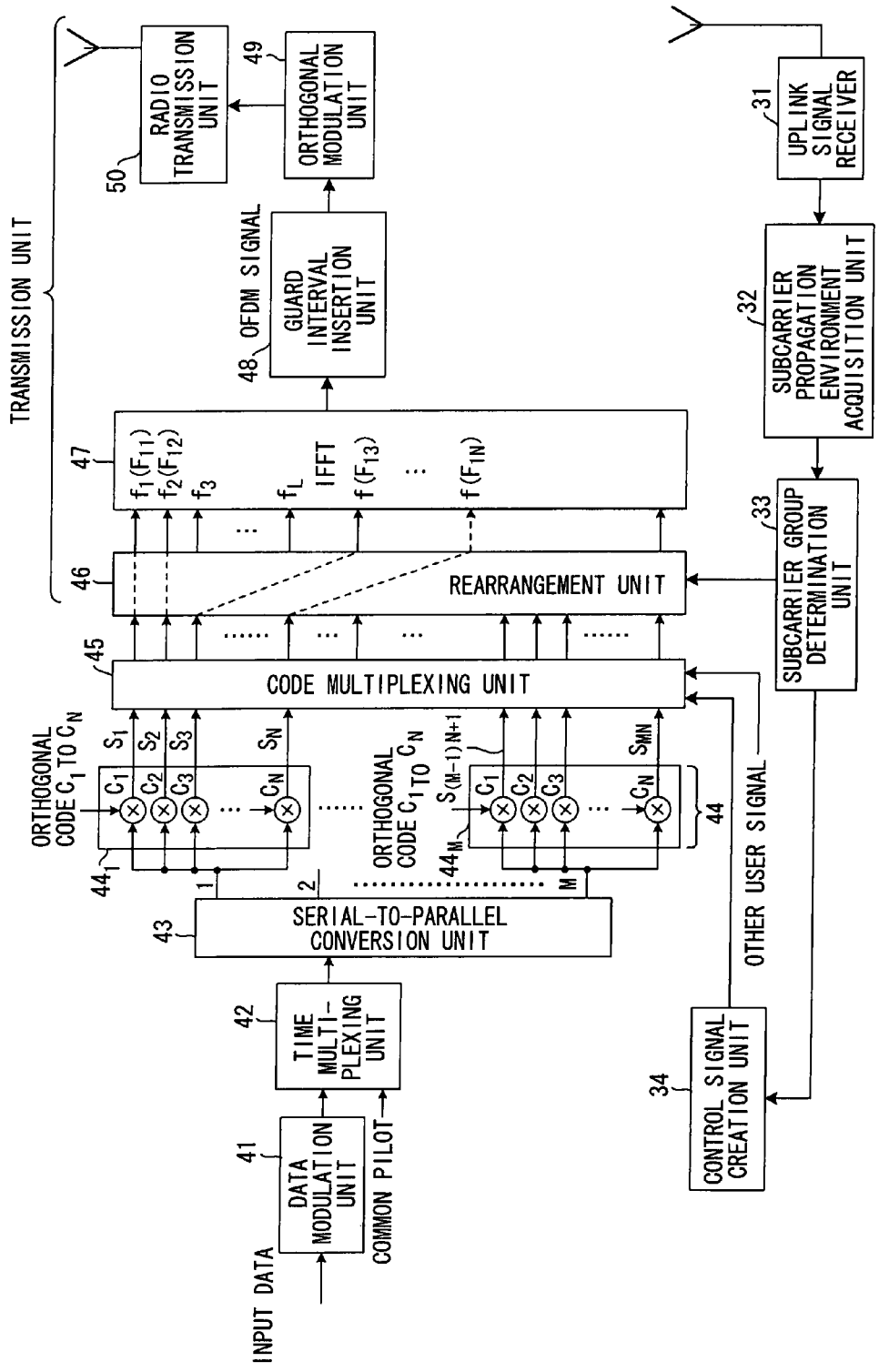
FIG. 2 is a drawing showing the construction of a transmission apparatus in an OFDM-CDMA communication system of a first embodiment of the invention.

FIG. 2 is a drawing showing the construction of a transmission apparatus (base station) in an OFDM-CDMA communication system of a first embodiment of the invention. This transmission apparatus multiplies each symbol of M number of symbols by spreading code that corresponds to a spreading factor to create a plurality of subcarrier components, and transmits the plurality of subcarrier components by corresponding subcarriers.

An Uplink signal receiver 31 receives a signal that is sent from a mobile station, and a subcarrier propagation environment acquisition unit 32 demodulates the signal from the mobile station and acquires reception environment information for each subcarrier, such as the reception power (square of the reception amplitude) or reception quality of each subcarrier and inputs the result to a subcarrier group determination unit 33. The subcarrier group determination unit 33 divides all of the subcarriers into a first to Mth group of N subcarriers each in order of highest reception power, then allots the N number of subcarriers of the first group to subcarrier components $S_1$ to $S_N$, allots the N number of subcarriers of the second group to subcarrier components $S_{N+1}$ to $S_{2N}$, ... and allots the N number of subcarriers of the Mth group to subcarrier components $S_{(M-1)N+1}$ to $S_{MN}$.

In other words, subcarriers having reception power whose size is close one another are grouped into the same subcarrier group, however, it is also possible to divide the subcarriers into groups according to the reception quality instead of reception power.

Also, the corresponding relation between the subcarrier components and subcarriers is input to a rearrangement unit 46 and control signal creation unit 34. The control signal creation unit 34 creates a control signal for notifying the mobile station of that corresponding relation information, spreads that control signal using spreading code for control, and inputs the result to a code multiplexing unit 45.

A data modulation unit 41 modulates the user's transmission data, and converts the data to a complex baseband signal (symbol) having a in-phase component and orthogonal component. A time multiplexing unit 42 performs time multiplexing of a plurality of symbol pilots before the transmission data. A serial-to-parallel conversion unit 43 converts the input data to parallel data for M number of symbols, divides each symbol into N number of branches and inputs the result to a spreading unit 44. The spreading unit 44 comprises M number of multiplication units $44_1$ to $44_M$, and each multiplication unit $44_1$ to $44_M$ individually multiplies N number of branch symbols by the chips $C_1, C_2, \ldots C_M$ of the channelization code, and outputs the result. As a result, subcarrier signals $S_1$ to $S_{MN}$ for multicarrier transmission using M×N number of subcarriers are output from the spreading unit 44. In other words, the spreading unit 44 multiplies each of M number of symbols with channelization code to perform spreading in the frequency direction. The channelization code that is used for spreading differs for each user, and code that is used as the channelization code for each user and for control is orthogonal to each other.

The code multiplexing unit 45 multiplexes the code of the subcarrier signals that were generated as described above with subcarrier signals for other users or subcarrier signals for control that are generated by a similar method. In other words, the code multiplexing unit 45 combines subcarrier signals for a plurality of users and subcarrier signals for control for each subcarrier of M×N number of subcarriers, and outputs the results.

A rearrangement unit 46 uses the corresponding relation between the subcarrier components $S_1$ to $S_{MN}$ and the subcarriers $f_1$ to $f_{MN}$ that is input from the subcarrier group determination unit 33 and rearranges the subcarrier components $S_1$ to $S_{MN}$ according to the corresponding subcarriers so that they can be input to the terminals of an IFFT unit 47. For example, when the subcarrier components $S_1$ to $S_{MN}$ correspond with the subcarriers $F_{11}, F_{12}, F_{13}, \ldots F_{1N}$ of the first group, they are rearranged as shown by the dashed lines in the figure.

The IFFT unit 47 performs inverse Fourier transformation of the subcarrier signals that are input in parallel, and converts them to M×N number of subcarrier signal components (OFDM signal) on the time axis. A guard interval insertion unit 48 inserts guard intervals having a specified length into the OFDM signal, an orthogonal modulation unit 49 performs orthogonal modulation of the OFDM signal in which guard intervals have been inserted, and a radio transmission unit 50 performs UP conversion of the signal to a radio frequency, as well as amplifies the signal and transmits it from an antenna. A transmission unit is constituted by units from the rearrangement unit 46 to the radio transmission unit 50.

Figure 3:
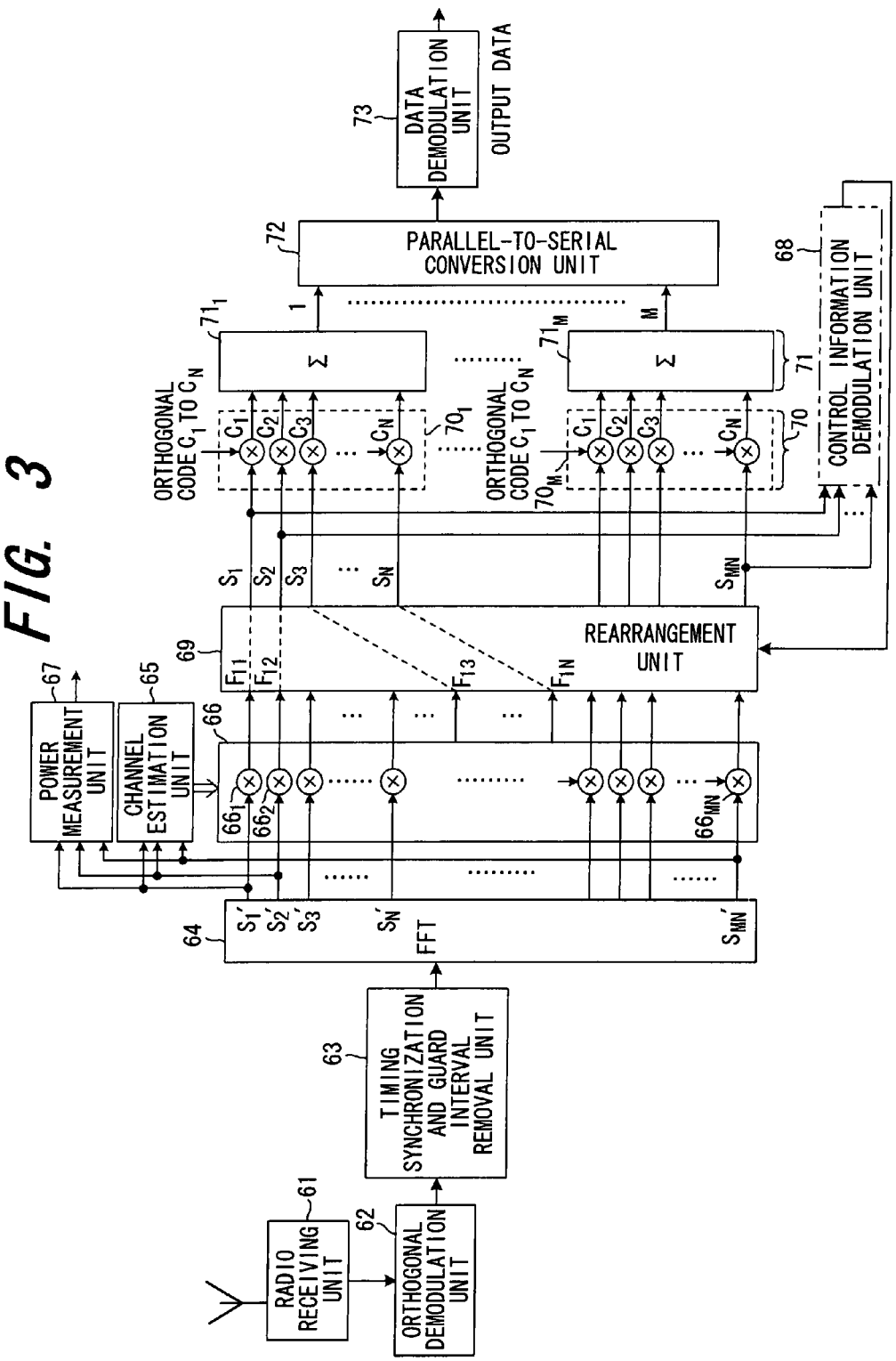
FIG. 3 is a drawing showing an example of construction of a receiving apparatus in an OFDM-CDMA communication system.

FIG. 3 shows an example of construction of a receiving apparatus (mobile station) in an OFDM-CDMA communication system. A radio receiving unit 61 performs frequency conversion of the received multicarrier signal, and an orthogonal demodulation unit 62 performs orthogonal demodulation of the received signal. A timing synchronization and guard interval removal unit 63 performs timing synchronization of the received signal, then removes the guard intervals GI from that received signal and inputs the result to an FFT unit 64. The FFT unit 64 performs FFT using FFT window timing, and transforms the signal in the time domain to M×N number of subcarrier signals (subcarrier samples) $S'_1$ to $S'_{MN}$.

A channel estimation unit 65 uses the pilots that were time multiplexed on the transmitting side to perform channel estimation for each subcarrier, finds channel compensation values for each subcarrier, then inputs those values to a channel compensation unit 66, and the channel compensation unit 66 multiplies each of the subcarriers by the channel compensation values to perform fading compensation (channel compensation). A power measurement 67 uses the time multiplexed pilots to calculate the reception power for each subcarrier. The reception power values for each subcarrier are transmitted to the transmission apparatus shown in FIG. 2 by a transmitter (not shown in the figure) as propagation environment information.

A control information demodulation unit 68 demodulates the control information that is transmitted from the transmission apparatus, then acquires the corresponding relation between the subcarrier components $S_1$ to $S_{MN}$ and subcarriers $f_1$ to $f_{MN}$ and inputs the result to a rearrangement unit 69. The rearrangement unit 69 uses the corresponding relation to perform rearrangement. For example, when the subcarrier components $S_1$ to $S_N$ correspond to the subcarriers $F_{11}$, $F_{12}$, $F_{13}$, ... $F_{1N}$ of the first group, rearrangement is performed as shown by the dashed lines in the figure.

A despreading unit 70 comprises M number of multiplication units $70_1$ to $70_M$, and multiplication unit $70_1$ individually multiplies N number of subcarrier components $S_1$ to $S_N$ with the chips $C_1$, $C_2$, ... $C_N$ of the channelization code that is allotted to the user, and outputs the result, and the other multiplication units perform a similar operation. As a result, despreading of the fading compensated signals is performed using channelization code that is allotted for each user, and from this despreading, the signals for a desired user are extracted from the code multiplexed signals.

Combination units $71_1$ to $71_M$ add the N number of multiplication results that are output from the multiplication units $70_1$ to $70_M$ to create parallel data comprising M number of symbols, a parallel-to-serial conversion unit 72 converts the parallel data to serial data, and a data demodulation unit 73 demodulates the transmission data.

With this first embodiment described above, by transmitting N number of subcarrier components, which are obtained by multiplying symbol data by channelization code having a spreading factor N, using subcarriers having close propagation environment (reception power, reception amplitude), it is possible to reduce the fluctuation of reception amplitude of the N number of subcarrier components on the receiving side. As a result, it is possible to prevent a loss of orthogonality on the receiving side between the N number of subcarrier components and channelization code for other users, and it is possible to prevent interference with signals from other users. Therefore, with this first embodiment of the invention it is possible to reduce the degree of reception error on the receiving side.

(C) Embodiment 2

In the first embodiment, the receiving apparatus (mobile station) measures the propagation environment (reception power) of a subcarrier, and notifies the transmission apparatus (base station) of it in an Uplink signal. This method is particularly useful in the FDD (Frequency Divisional Duplex) method, since the Uplink and Downlink frequencies differ. However, in the TDD (Time Divisional Duplex) method, the Uplink and Downlink frequencies are the same, so it is possible for the propagation environment of the Downlink signal to be measured on the base station side. This method has a merit in that it is not necessary to exchange propagation environment information between the mobile station and the base station.

Figure 4:
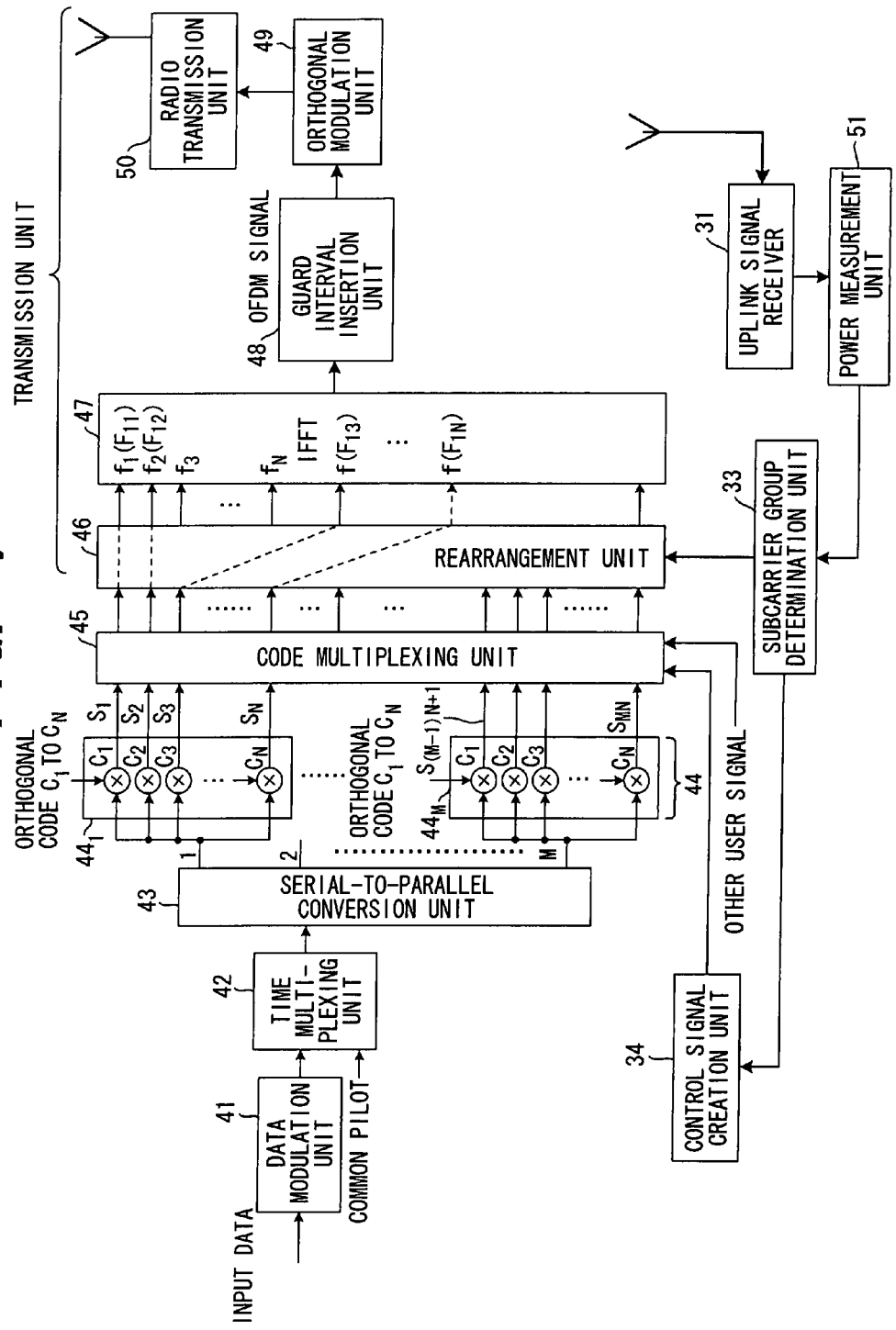
FIG. 4 is a drawing showing the construction of a transmission apparatus in an OFDM-CDMA communication system of a second embodiment of the invention.

FIG. 4 is a drawing showing the construction of the transmission apparatus in an OFDM-CDMA communication system of a second embodiment of the invention, where the same reference numbers are used for parts that are the same as those of the first embodiment shown in FIG. 2. This embodiment differs in that there is a power measurement unit 51 as a subcarrier propagation environment acquisition unit, and the transmission apparatus measures and acquires the propagation environment (reception power) for each subcarrier. The power measurement unit 51 uses the pilots that have been time multiplexed on the Uplink signal to calculate the reception power for each subcarrier, and inputs the results to the subcarrier group determination unit 33. After that, control is performed the same as in the first embodiment.

(D) Embodiment 3

The conventional method of allotting a total of M×N number of subcarrier components, which are obtained by multiplying M number of symbols by channelization code, to M×N number of subcarriers in the order of frequency is useful in that the amount of transmitted information is decreased since it is not necessary to exchange the corresponding relation between the subcarrier components $S_1$ to $S_{MN}$ and subcarriers $f_1$ to $f_{MN}$ between the base station and the mobile station.

Therefore, when the communication environment is good, M×N number of subcarrier components are allotted to each subcarrier in order of frequency, and when the communication environment is not good, M×N number of subcarrier components are allotted to subcarriers based on the group divisions of the first embodiment.

Figure 5:
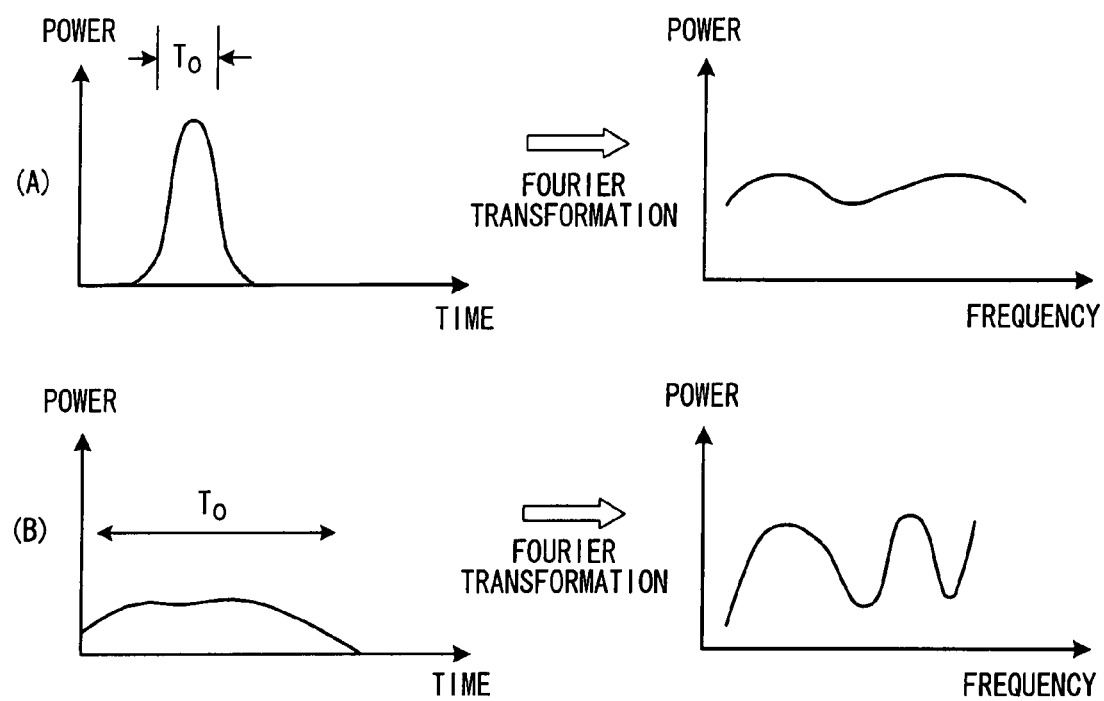
FIG. 5 is a drawing explaining the relationship between delay spread and frequency selective fading.

Fluctuation in the frequency selective fading is intimately related to multipaths. As shown on the left side of (A) and (B) of FIG. 5, for multipaths, the power is obtained as a function of time, however, as shown on the right side of the figure, after Fourier transformation, the frequency selective fading is obtained. As shown in (A) of FIG. 5, when the communication environment is good and the multipath delay spread TD of the multipaths is small, frequency selective fading becomes gradual. However, as shown in (B) of FIG. 5, when the communication environment is not good and the multipath delay spread TD is large, fluctuation of the frequency selective fading becomes large.

Therefore, in this third embodiment, when the fluctuation of the frequency selective fading is small and the loss of code orthogonality is small (when detected as being small), M×N number of subcarrier components are allotted to each subcarrier in order of frequency, and when the communication environment is not good, or in other words, when the fluctuation of the frequency selective fading is large and the loss of code orthogonality is large, the M×N number of subcarrier components are allotted to subcarriers based on the group divisions of the first embodiment.

Figure 6:
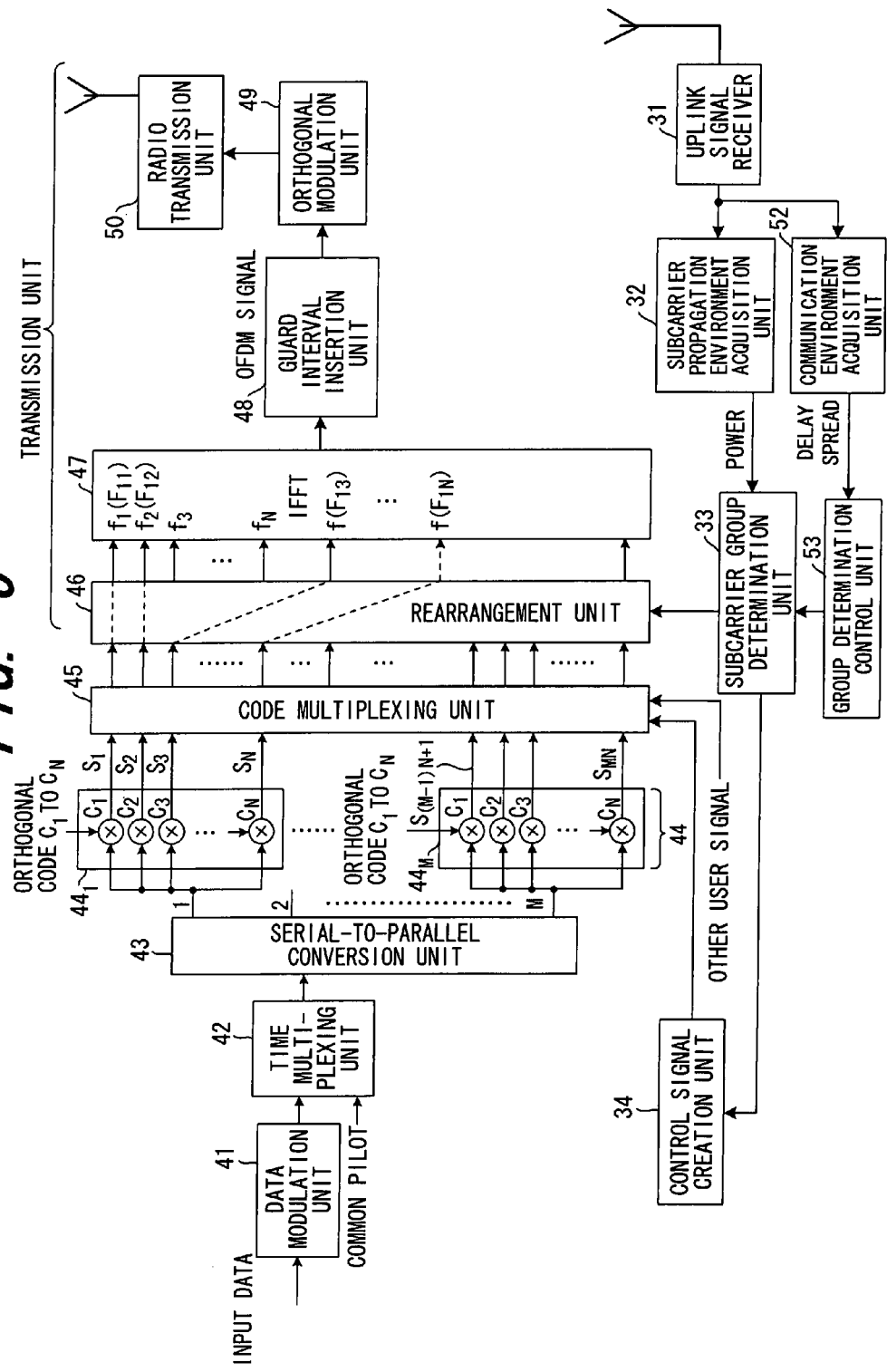
FIG. 6 is a drawing showing the construction of a transmission apparatus in an OFDM-CDMA communication system of a third embodiment of the invention.

FIG. 6 is a drawing showing the construction of the transmission apparatus in an OFDM-CDMA communication system of this third embodiment of the invention, where the same reference numbers are used for parts that are the same as those of the first embodiment shown in FIG. 2. This embodiment differs in that there is a communication environment acquisition unit 52 and group determination control unit 53. The communication environment acquisition unit 52 demodulates a signal from the mobile station and acquires communication environment information, for example, delay spread, then inputs the result to the group determination control unit 53.

The group determination control unit 53 determines whether or not the communication environment is good based on the size of delay spread, and when the delay spread is shorter than a set value and the communication environment is good, instructs the subcarrier group determination unit 33 to allot subcarrier components $S_1$ to $S_{MN}$ to subcarriers $f_1$ to $f_{MN}$ in order of frequency. On the other hand, when the delay spread is longer than a set value and the communication environment is not good, the group determination control unit 53 instructs the subcarrier group determination unit 33 to allot subcarrier components to subcarriers based on group divisions as in the first embodiment.

When instructed to allot subcarrier components to each subcarrier in order of frequency, the subcarrier group determination unit 33 notifies the rearrangement unit 46 and control signal creation unit 34 of that, and the rearrangement unit 46 allots the subcarrier components $S_1$ to $S_{MN}$ to subcarriers $f_1$ to $f_{MN}$ in the order of frequency. Also, the control signal creation unit 34 creates a control signal to notify the mobile station that the corresponding relation between the subcarrier components and subcarriers is the order of frequency, then spreads that control signal using spreading code for control, and inputs the result to the code multiplexing unit 45.

On the other hand, when instructed to allot subcarrier components to subcarriers based on the group divisions of the first embodiment, the subcarrier group determination unit 33 divides the subcarriers in order of highest reception power into a first to Mth group having N number of subcarriers in each group, and allots M number of subcarrier components $S_1$ to $S_{MN}$ to each group. Also, the subcarrier group determination unit 33 inputs the corresponding relation between the subcarrier components and subcarriers to the rearrangement unit 46 and control signal creation unit 34. The control signal creation unit 34 creates a control signal for notifying the mobile station of the corresponding relation information, then spreads that control signal using spreading code for control and inputs the result to the code multiplexing unit 45. The rearrangement unit uses the corresponding relation between the subcarriers $S_1$ to $S_{MN}$ and subcarriers $f_1$ to $f_{MN}$ that was input from the subcarrier group determination unit 33, and rearranges the subcarrier components $S_1$ to $S_{MN}$ so that they can be input to the terminals of the IFFT unit 47 according to the corresponding subcarriers.

Figure 7:
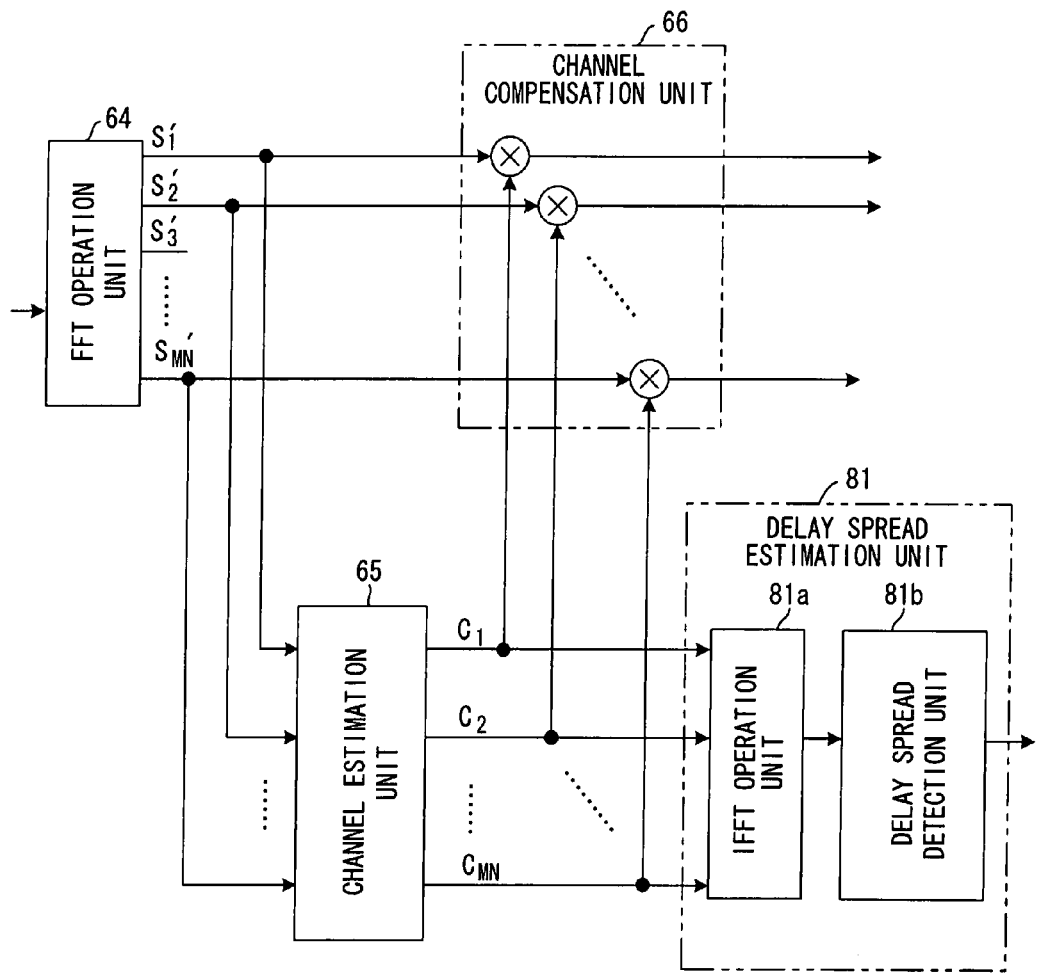
FIG. 7 is a drawing showing the main construction of a receiving apparatus that comprises a delay spread estimation unit.
Figure 8:
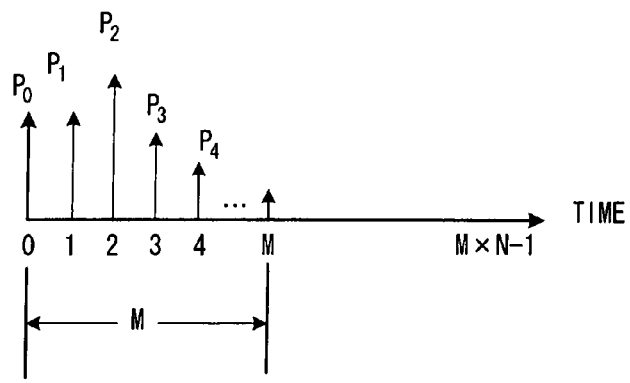
FIG. 8 is a drawing explaining a delay profile and delay spread.

FIG. 7 is a drawing that shows the major construction of a receiving apparatus that comprises a delay spread estimation unit 81, where the same reference numbers are used for the same parts shown in FIG. 3. The FFT unit 64 performs FFT processing of the OFDM symbol data, converts to the number of subcarriers M×N number of signals $S'_1$ to $S'_{MN}$, and outputs channel estimation values $C_1$ to $C_{MN}$. Each of the multiplication units of the channel compensation unit 66 multiply the subcarrier signal of the transmission symbol by a channel compensation value to compensate for fading. The IFFT operation unit 81a of the delay spread estimation unit 81 performs the IFFT operation on the M×N number of channel estimation values $C_1$ to $C_{MN}$ that are output from the channel estimation unit 65, and as shown in FIG. 8, outputs a delay profile comprising M×N number of samples per one OFDM symbol. Each sample value indicates the strength of the received waves (direct wave, delay wave) in the multipaths, and when going from the FFT window position (=0) and past the delay time M, each of the sample values of the delay profile become a value less than a set level. The delay spreading detection unit 81b detects and outputs the delay time M as the delay spread and transmits it to the transmitting unit. The delay spread indicates the width of the multipaths and can be used when determining whether or not the reception state of the mobile station is good. When the delay spread is large, the maximum delay time is large and the reception state is poor, and when the delay spread is small, the maximum delay time is small and the reception state is good.

In the third embodiment described above, the case is explained in which the delay spread is measured by the reception apparatus (mobile station) and transmitted to the transmission apparatus (base station), however, it is possible to measure the delay spread for each mobile station on the base station side. In other words, when the Downlink and Uplink transmission frequencies are the same, or when the frequencies are not that different, then the path delay characteristics are regarded as being nearly the same for the Uplink and Downlink; and in this case, it is also possible for the transmission apparatus to have a delay spread estimation unit as shown in FIG. 7.

(E) Embodiment 4

The amount of deterioration that occurs when subcarrier components $S_1$ to $S_{MN}$ are allotted to subcarriers $f_1$ to $f_{MN}$ in order of frequency becomes larger as the spreading factor increases. For example, in the case of the propagation environment shown in FIG. 1, if the spreading factor is 2, only adjacent subcarriers are used, so the difference in amplitude is not that large. However, if the spreading factor is 8, a maximum of 8 subcarriers are used, so the difference in amplitude becomes large, the loss of orthogonality becomes large and deterioration of the reception characteristic becomes large.

Therefore, when the spreading factor is small, the loss of orthogonality is small, so M×N number of subcarrier components, which are multiplied by channelization code, are allotted to each subcarrier in order of frequency, and when the spreading factor is large, the loss of orthogonality is large, so M×N number of subcarrier components are allotted to subcarriers based on the group divisions of the first embodiment. Doing this is useful in that there is no need to exchange information about the corresponding relation between the subcarrier components $S_1$ to $S_{MN}$ and subcarriers $f_1$ to $f_{MN}$ between the base station and mobile station.

Figure 9:
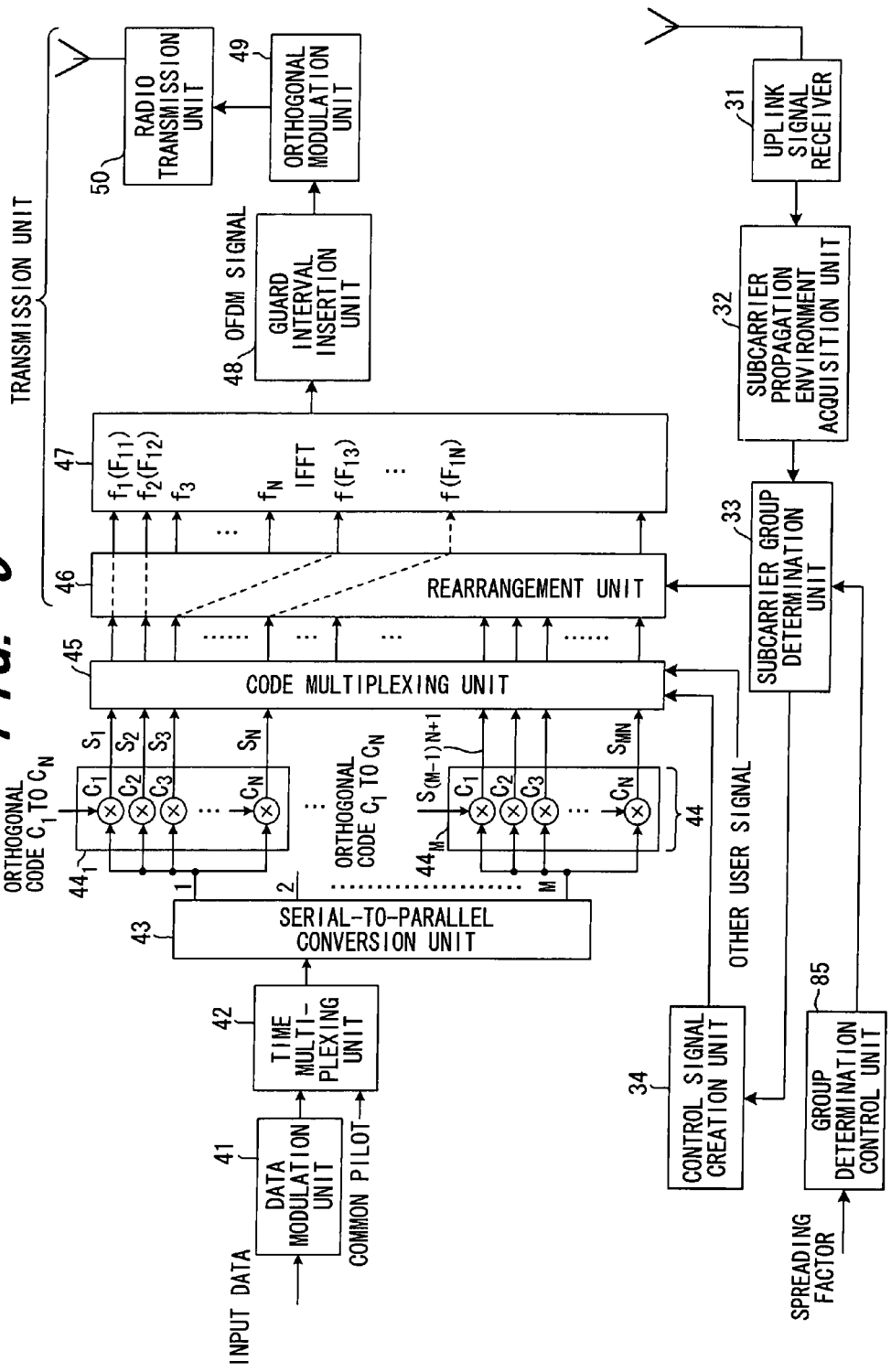
FIG. 9 is a drawing showing the construction of a transmission apparatus in an OFDM-CDMA communication system of a fourth embodiment of the invention.

FIG. 9 is a drawing showing the construction of the transmission apparatus in an OFDM-CDMA communication system of a fourth embodiment of the invention, where the same reference numbers are used for parts that are the same as those of the first embodiment shown in FIG. 2. This embodiment differs in that there is a group determination control unit 85 that specifies the subcarrier group determination method based on the size of the spreading factor.

The group determination control unit 85 compares the spreading factor N with a set value, and when the spreading factor N is less than the set value, instructs the subcarrier group determination unit 33 to allot subcarrier components $S_1$ to $S_{MN}$ to subcarriers $f_1$ to $f_{MN}$ in order of frequency. However, when the spreading factor N is greater than the set value, the group determination control unit 85 instructs the subcarrier group determination unit 33 to allot subcarrier components to subcarriers based on group division in the same way as done in the first embodiment.

When the subcarrier group determination unit 33 is instructed to allot subcarrier components to each subcarrier in order of frequency, it notifies the rearrangement unit 46 and control signal creation unit 34 of that, and the rearrangement unit 46 allots the subcarrier components $S_1$ to $S_{MN}$ to the subcarriers $f_1$ to $f_{MN}$ in order of frequency. The control signal creation unit 34 creates a control signal for notifying the mobile station that the corresponding relation between the subcarrier components and subcarriers is the order of frequency, spreads that control signal using spreading code for control, and inputs the result to the code multiplexing unit 45.

On the other hand, when the subcarrier group determination unit 33 is instructed to allot subcarrier components to subcarriers based on the group divisions of the first embodiment, it divides the subcarrier components in order of highest reception power into a first to Mth group so there are N number of subcarriers in each group, and allots in order N number of subcarrier components $S_1$ to $S_{MN}$ to each group. Also, the subcarrier group determination unit 33 inputs this corresponding relation between the subcarrier components and subcarriers to the rearrangement unit 46 and control signal creation unit 34. The control signal creation unit 34 creates a control signal for notifying the mobile station of this corresponding relation information, spreads that control signal using spreading code for control, and inputs the result to the code multiplexing unit 45. The rearrangement unit 46 uses the corresponding relation between the subcarrier components $S_1$ to $S_{MN}$ and subcarriers $f_1$ to $f_{MN}$ that is input from the subcarrier group determination unit 33 to rearrange the subcarrier components $S_1$ to $S_{MN}$ according to the corresponding subcarriers so that they can be input to the terminals of the IFFT unit 47.

(F) Embodiment 5

In the case of the FDD method, the mobile station measures the propagation environment as in the first embodiment, and must send that as feedback to the base station. Therefore, a difference occurs in the time when the propagation environment is measured, and the time when the data on which that result of the measurement is reflected is actually received. When the mobile station is moving at a fast speed, the fluctuation in fading in the time direction is large, so there is a possibility that the propagation environment will change during this time difference.

Therefore, when the speed of movement is slow and fluctuation in the time direction is small, M×N number of subcarrier components, which are multiplied by channelization code, are divided based on the group divisions of the first embodiment and allotted to subcarriers in each group with N number of subcarrier components in each group, and when the speed of movement is fast and the fluctuation of fading is large, M×N number of subcarrier components, which are multiplied by channelization code, are allotted to each subcarrier in order of frequency.

Figure 10:
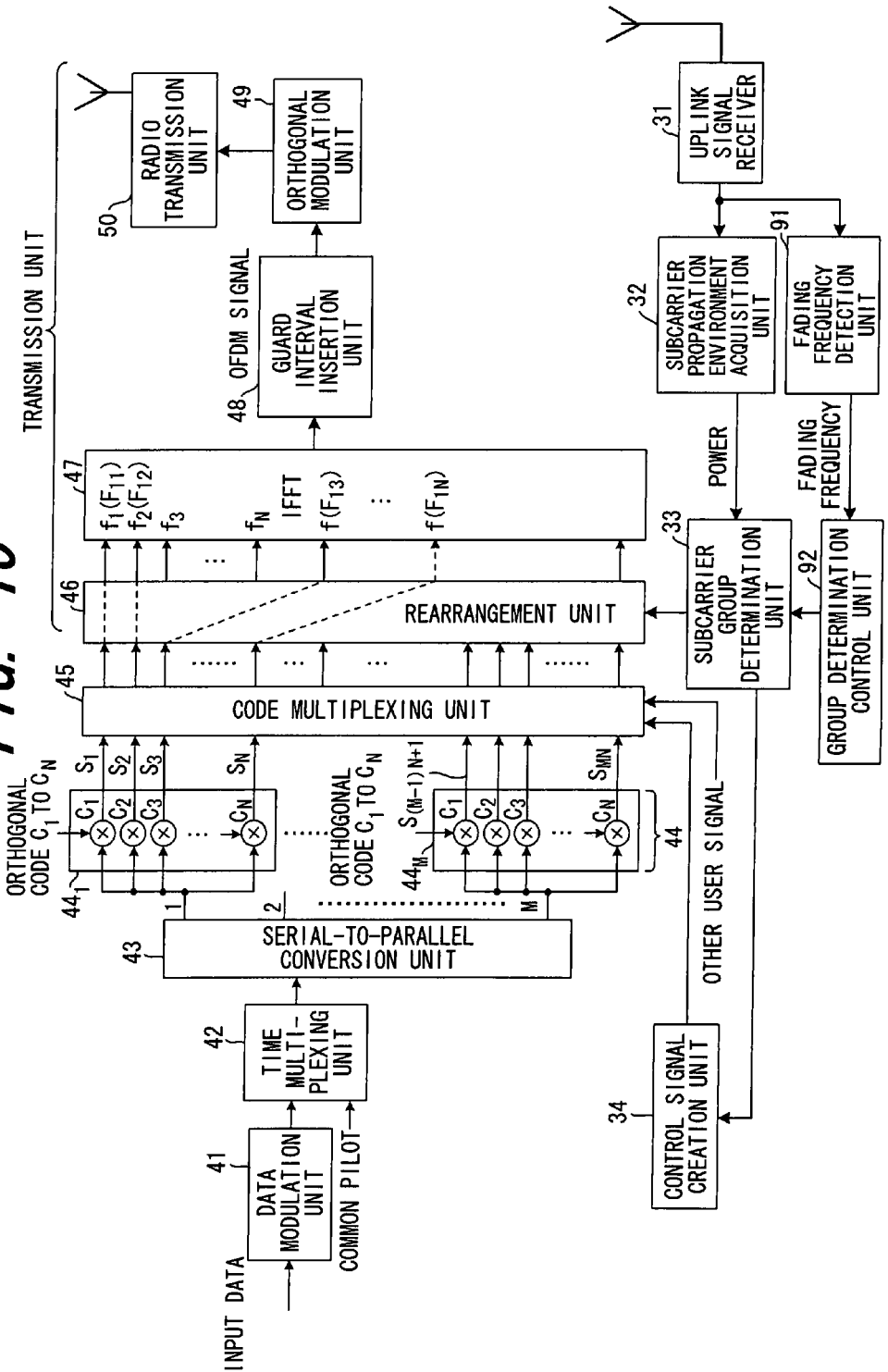
FIG. 10 is a drawing showing the construction of a transmission apparatus in an OFDM-CDMA communication system of a fifth embodiment of the invention.

FIG. 10 is a drawing showing the transmission apparatus in an OFDM-CDMA communication system of a fifth embodiment of the invention, where the same reference numbers are used for parts that are the same as those of the first embodiment shown in FIG. 2. This embodiment differs in that there is a fading frequency detection unit 91 and group determination control unit 92. The fading frequency detection unit 91 demodulates a signal from a mobile station and detects the fading frequency, then inputs the result to the group determination control unit 92. When the fading frequency is greater than a set value, the group determination control unit 92 instructs the subcarrier group determination unit 33 to allot subcarrier components $S_1$ to $S_{MN}$ to subcarriers $f_1$ to $f_{MN}$ in order of frequency. On the other hand, when the fading frequency is less than a set value, the group determination control unit 92 instructs the subcarrier group determination unit 33 to allot subcarrier components to subcarriers based on group divisions as in the first embodiment.

When the subcarrier group determination unit 33 is instructed to allot subcarrier components to each subcarrier in order of frequency, it notifies the rearrangement unit 46 and control signal creation unit 34 of that, and the rearrangement unit 46 allots the subcarrier components $S_1$ to $S_{MN}$ to the subcarriers $f_1$ to $f_{MN}$ in order of frequency. The control signal creation unit 34 creates a control signal for notifying the mobile station that the corresponding relation between the subcarrier components and subcarriers is the order of frequency, spreads that control signal using spreading code for control, and inputs the result to the code multiplexing unit 45.

On the other hand, when the subcarrier group determination unit 33 is instructed to allot subcarrier components to subcarriers based on the group divisions of the first embodiment, it divides the subcarrier components in order of highest reception power into a first to Mth group so there are N number of subcarriers in each group, and allots in order N number of subcarrier components $S_1$ to $S_{MN}$ to each group. Also, the subcarrier group determination unit 33 inputs this corresponding relation between the subcarrier components and subcarriers to the rearrangement unit 46 and control signal creation unit 34. The control signal creation unit 34 creates a control signal for notifying the mobile station of this corresponding relation information, spreads that control signal using spreading code for control, and inputs the result to the code multiplexing unit 45. The rearrangement unit 46 uses the corresponding relation between the subcarrier components $S_1$ to $S_{MN}$ and subcarriers $f_1$ to $f_{MN}$ that is input from the subcarrier group determination unit 33 to rearrange the subcarrier components $S_1$ to $S_{MN}$ according to the corresponding subcarriers so that they can be input to the terminals of the IFFT unit 47.

Figure 11:
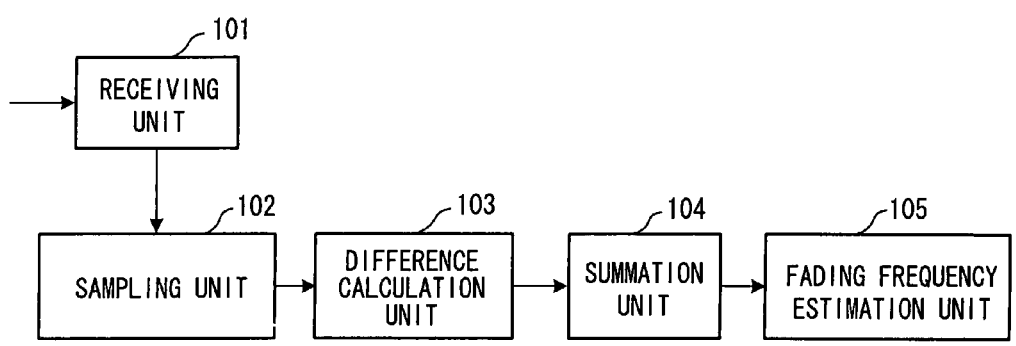
FIG. 11 is a drawing showing the construction of a fading frequency estimation unit.
Figure 12:
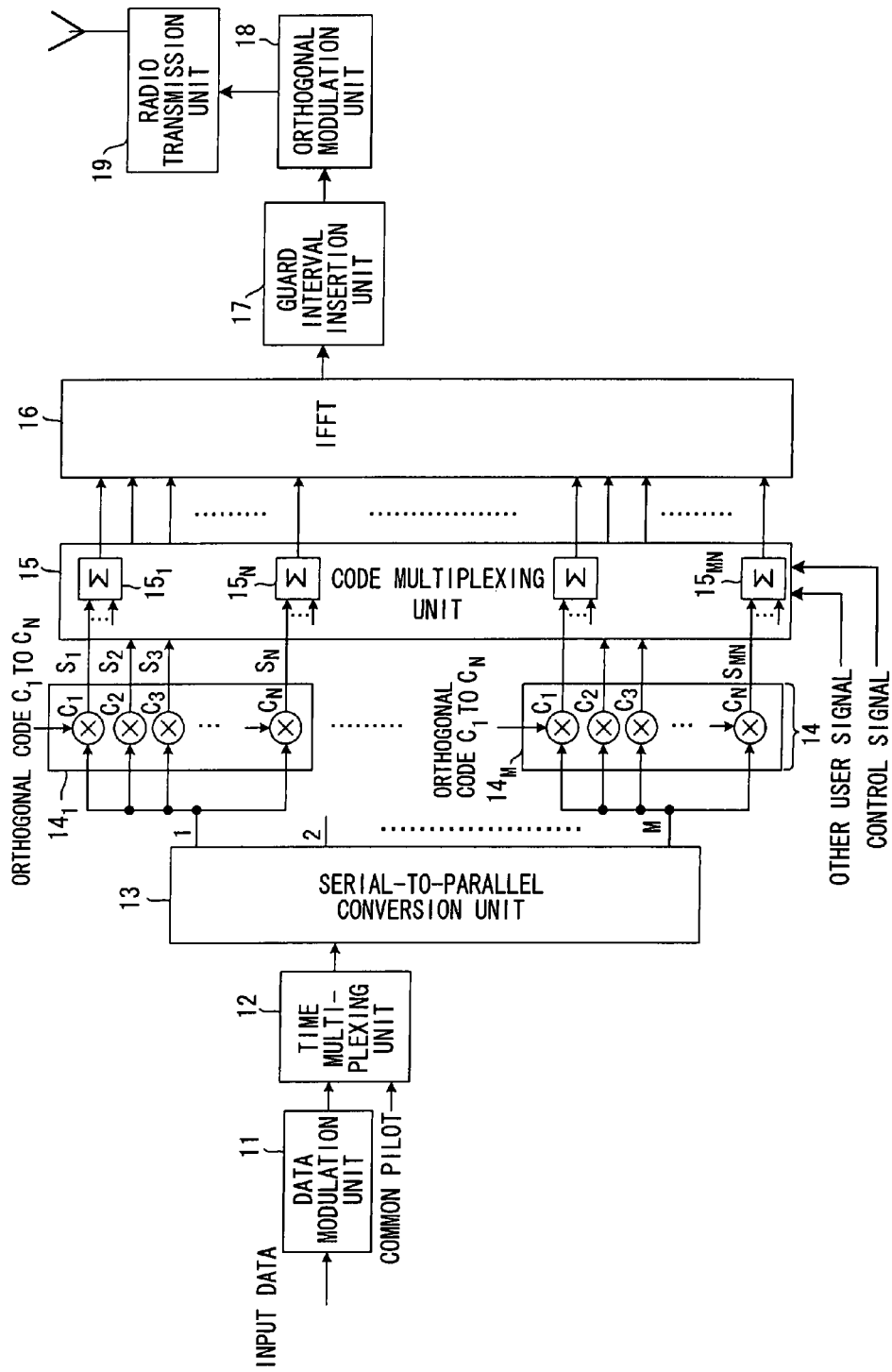
FIG. 12 is a drawing showing an example of the transmitting side (base station) in a prior OFDM-CDMA communication system.
Figure 13:
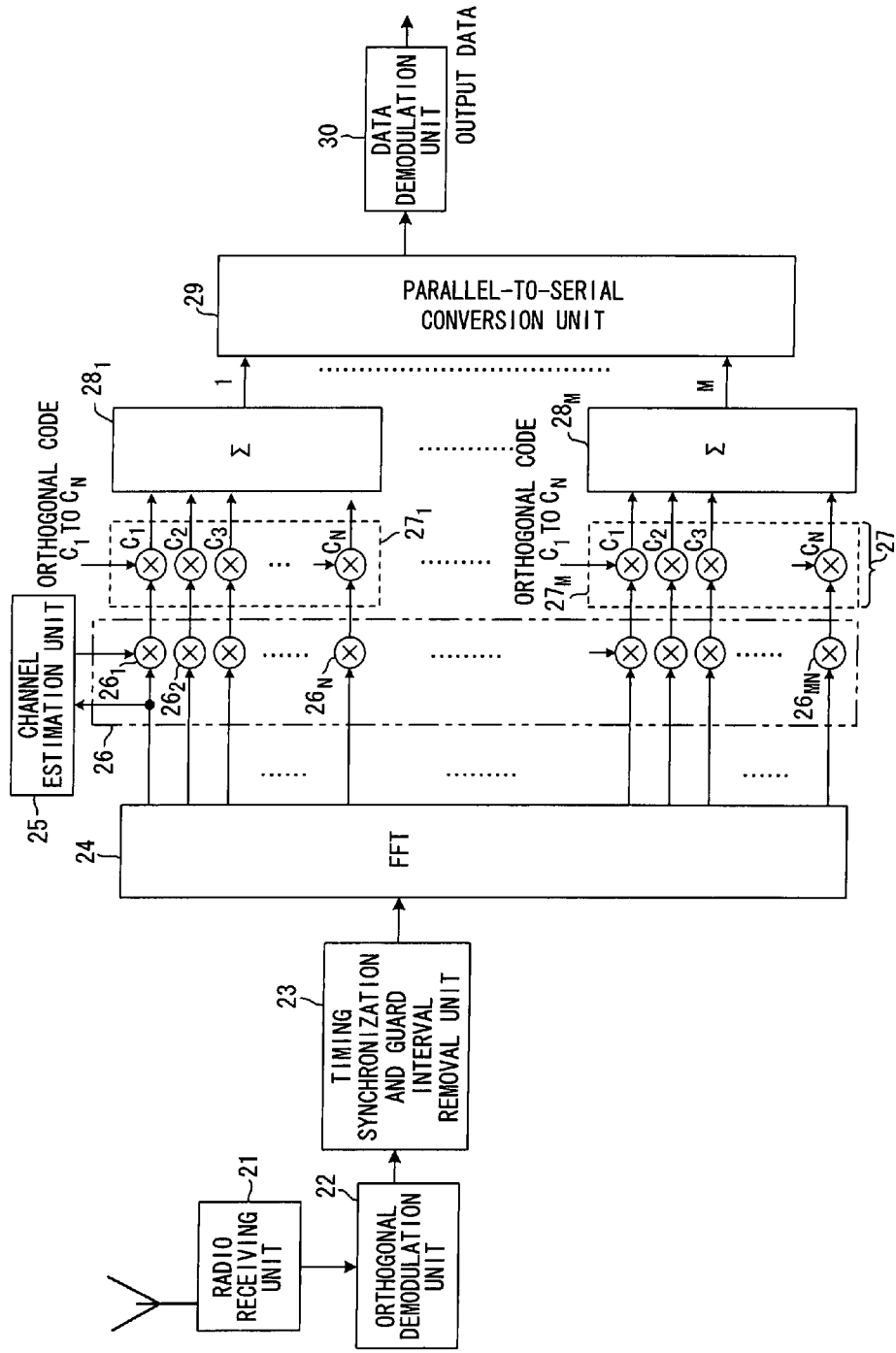
FIG. 13 is a drawing showing an example of the receiving side (mobile station) in a prior OFDM-CDMA communication system.
Figure 14:
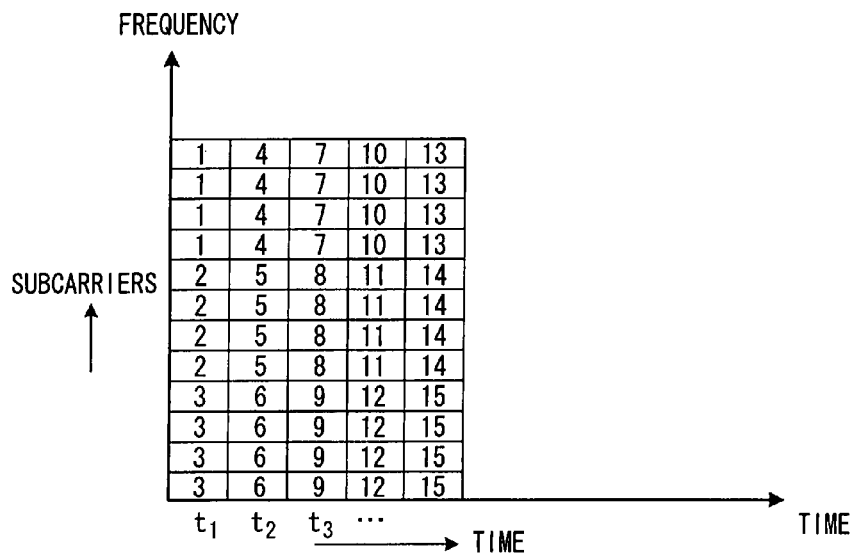
FIG. 14 is a drawing explaining the case in which spreading is performed in the frequency direction for each symbol in the OFDM-CDMA communication method.
Figure 15:
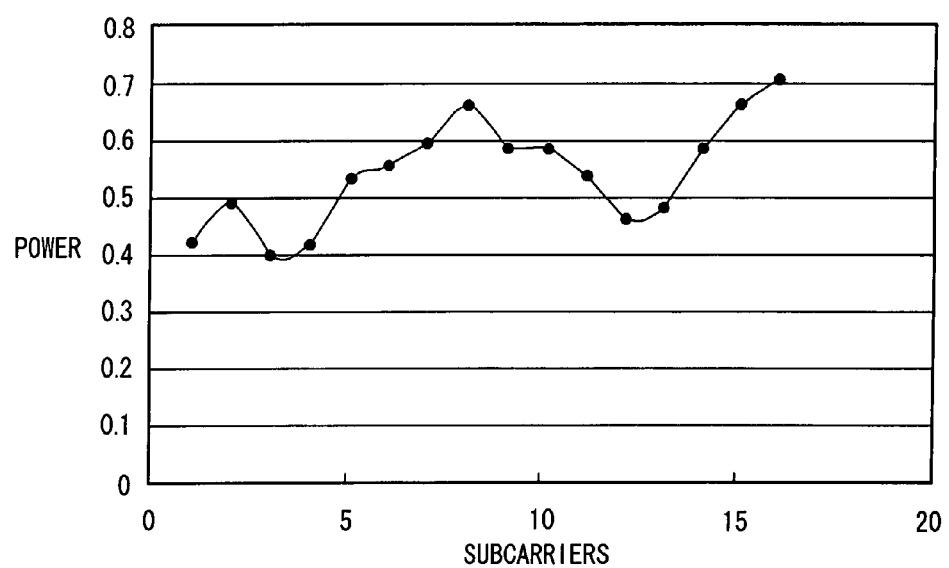
FIG. 15 is a drawing explaining the propagation environment of subcarriers.

FIG. 11 is a drawing showing the construction of the fading frequency estimation unit in the reception apparatus. The reception unit 101 selects and outputs a pilot signal from a signal received by the antenna, a sampling unit 102 samples that pilot signal over a set period, a difference calculation unit 103 calculates the difference between the levels of adjacent sampling signals, a summation unit 104 sums the difference during a specified time, and a fading frequency estimation unit 105 estimates the fading frequency based on the summation value. Taking the reception power waveform into consideration, when the fading frequency is low, the slope of the peak is gradual, and when the fading frequency is high, the slope of the peak is steep. Therefore, The fading frequency estimation apparatus shown in FIG. 11 calculates the slope of the peak of the reception power waveform by way of the sampling unit 102, difference calculation unit 103 and summation unit 104, and estimates the fading frequency based on the slope of that waveform.

With the present invention described above, by transmitting N number of subcarrier components, which are obtained by multiplying symbol data by spreading code having a spreading factor N, by subcarriers having propagation environments (reception power, reception amplitude) that are close, it is possible to reduce the fluctuation in reception power of the N number of subcarrier components on the receiving side. As a result, it is possible to prevent a loss of orthogonality between the N number of subcarrier components and the spreading code of other users on the receiving side, prevent interference with signals of other users, and improve the reception accuracy on the receiving side.

Also, with the present invention, M×N number of subcarrier components, which are obtained by multiplying symbol data by spreading code having a spreading factor N, are allotted to each subcarrier in the order of frequency and transmitted when the communication environment is good, so there is no need for the transmission apparatus to notify the receiving apparatus of the corresponding relation between the subcarrier components and subcarriers, which is useful in reducing the amount of communication.

Moreover, with the present invention, M×N number of subcarrier components, which are obtained by multiplying symbol data by spreading code having a spreading factor N, are allotted to each subcarrier in the order of frequency and transmitted when the spreading factor is small, so there is no need for the transmission apparatus to notify the receiving apparatus of the corresponding relation between the subcarrier components and subcarriers, which is useful in reducing the amount of communication.

Furthermore, with the present invention, when frequency fading is large, N number of subcarrier components, which are obtained by multiplication by spreading code, are allotted to each subcarrier in order of frequency and transmitted, and when frequency fading is small, N number of subcarrier components, which are obtained by multiplying symbol data having a spreading factor N, are transmitted by subcarriers having propagation environments (reception power, reception amplitude) that are close, so even when there is a time difference occurs between the time when the propagation environment is measured and the time when the data on which the result is reflected is actually received, it is possible to perform control so that no adverse effect occurs due to that time difference.

What is claimed is:

1. A transmission method in an Orthogonal Frequency Division Multiplex and Code Division Multiple Access (OFDM-CDMA) communication system that generates a plurality N of subcarrier components for each transmission symbol by spreading each of M number of transmission symbols with spreading code having a spreading factor N, and transmits those subcarrier components for each transmission symbol by a plurality of different subcarriers from a transmitter, comprising:
   measuring a propagation environment of each of M×N number of subcarriers;
   dividing all of the subcarriers into first to Mth groups of N number of subcarriers, wherein the subcarriers are grouped according to whose propagation environments are close to one another based on the measurement results;
   using the N number of subcarriers of a predetermined group for transmitting said plurality N number of subcarrier components for each symbol;
   creating a control signal for notifying a receiving side of a relationship between the subcarrier components and subcarriers;
   generating a group determination control signal specifying the subcarrier group determination based on a size of the spreading factor N; and wherein N and M are integers.

2. The transmission method in the OFDM-CDMA communication system of claim 1, further comprising transmitting information for identifying the N number of subcarrier components for each transmission symbol to the receiving side from the transmitter.

3. The transmission method in the OFDM-CDMA communication system of claim 2, further comprising: demodulating the M×N number of the subcarrier components; identifying the N number of subcarrier components for each symbol based upon said information transmitted from the transmitter; and multiplying the N number of subcarrier components for each symbol by said spreading code, thereby despreading is performed on the receiving side.

4. The transmission method in the OFDM-CDMA communication system of claim 1, wherein
   the receiving side measures an amplitude or power of each subcarrier, and notifies the transmitting side of the amplitude or power of each subcarrier as the propagation environment; and
   the transmitting side divides each of the subcarriers into groups based on the amplitude or power.

5. The transmission method in the OFDM-CDMA communication system of claim 1, wherein
   the transmitting side measures the propagation environment of each of the subcarriers from an amplitude or power, and divides each of the subcarriers into groups based on the amplitude or power.

6. The transmission method in the OFDM-CDMA communication system of claim 1, further comprising:
   measuring a communication environment of an OFDM-CDMA communication; allotting N number of subcarrier components, which are obtained by multiplying each symbol by said spreading code, to each subcarrier in order of frequency when the communication environment is good; and
   allotting N number of subcarriers of said predetermined group for transmission of said plurality N of subcarrier components for each symbol when the communication environment is not good.

7. The transmission method in the OFDM-CDMA communication system of claim 6, that further comprising:
   measuring a delay spread of multipaths of said communication environment of the OFDM-CDMA communication; and determining that the communication environment is good when the delay spread is small.

8. The transmission method in the OFDM-CDMA communication system of claim 1, further comprising: acquiring fading frequency; allotting N number of subcarriers of said predetermined group for transmission of said plurality N of subcarrier components for each symbol when the fading frequency is large; and allotting N number of subcarrier components, which are obtained by multiplying each symbol by said spreading code, to each subcarrier in order of frequency when the fading frequency is small.

9. The transmission method in the OFDM-CDMA communication system of claim 1, further comprising: monitoring the spreading factor in an OFDM-CDMA communication; allotting N number of subcarrier components, which are obtained by multiplying each symbol by said spreading code, to each subcarrier in order of frequency when the spreading factor is small; and allotting N number of subcarriers of said predetermined group for transmission of said plurality N of subcarrier components for each symbol when the spreading factor is large.

10. A transmission apparatus in an Orthogonal Frequency Division Multiplex and Code Division Multiple Access (OFDM-CDMA) communication system that generates a plurality N of subcarrier components for each transmission symbol by spreading each of M number of transmission symbols with spreading code having a spreading factor N, and transmits those subcarrier components for each transmission symbol by a plurality of different subcarriers from a transmitter, comprising:
   a propagation environment acquisition unit that acquires the propagation environment of each of M×N number of subcarriers;
   a group division unit that divides all of the subcarriers into a first to Mth groups of N number of subcarriers, wherein the subcarriers are grouped according to whose propagation environments are close to one another based on the acquired propagation environment;

a transmission unit that transmits said plurality N of subcarrier components for each symbol using the N number of subcarriers of a predetermined group;

a control signal creation unit configured to create a control signal for notifying the receiving side of a relationship between the subcarrier components and subcarriers;

a group determination control unit configured to specify the subcarrier group determination based on a size of the spreading factor N; and wherein N and M are integers.

11. The transmission apparatus in the OFDM-CDMA communication system of claim 10, wherein said transmission unit transmits information for identifying the N number of subcarrier components for each symbol to the receiving side.

12. The transmission apparatus in the OFDM-CDMA communication system of claim 11, wherein the receiving side demodulates the M×N number of the subcarrier components, identifies N number of subcarrier components for each symbol based upon said information transmitted from the transmitter; and multiplies the N number of subcarrier components for each symbol by said spreading code, thereby despreading is performed on the receiving side.

13. The transmission apparatus in the OFDM-CDMA communication system of claim 10, wherein said propagation environment acquisition unit acquires an amplitude or power of each subcarrier that is measured on the receiving side as the propagation environment; and said group division unit divides each of the subcarriers into groups based on the amplitude or power.

14. The transmission apparatus in the OFDM-CDMA communication system of claim 10, wherein said propagation environment acquisition unit includes a measurement unit that measures the propagation environment of each subcarrier from a received signal.

15. The transmission apparatus in the OFDM-CDMA communication system of claim 10, further comprising:

a communication environment acquisition unit that acquires information related to the communication environment of the OFDM-CDMA communication; and a group determination control unit that performs control so that N number of subcarriers of said group are allotted for transmission of said plurality N of subcarrier components for each symbol when the communication environment is not good, and performs control so that N number of subcarrier components that are obtained by multiplying each symbol by said spreading code are allotted to each subcarrier in order of frequency when the communication environment is good.

16. The transmission apparatus in the OFDM-CDMA communication system of claim 15, wherein said communication environment acquisition unit acquires a multipath delay spread as information indicating the communication environment; and said group determination control unit determines that the communication environment is good when the delay spread is small, and determines that the communication environment is poor when the delay spread is large.

17. The transmission apparatus in the OFDM-CDMA communication system of claim 10, further comprising:

a fading frequency acquisition unit that acquires fading frequency; and a group determination control unit that performs control so that N number of subcarriers of said group are allotted for transmission of said plurality N of subcarrier components for each symbol when the fading frequency is large, and performs control so that N number of subcarrier components that are obtained by multiplying each symbol by said spreading code are allotted to each subcarrier in order of frequency when the fading frequency is small.

18. The transmission apparatus in the OFDM-CDMA communication system of claim 10, further comprising a group determination control unit that performs control so that N number of subcarriers of said group are allotted for transmission of said plurality N of subcarrier components for each symbol when the spreading factor is large, and performs control so that N number of subcarrier components that are obtained by multiplying each symbol by said spreading code are allotted to each subcarrier in order of frequency when the spreading factor is small.

* * * * *